J. D. BRIGHT & J. N. DeGUIRE.
Churn-Dasher.

No. 167,493. Patented Sept. 7, 1875.

UNITED STATES PATENT OFFICE.

JOHN D. BRIGHT AND JASPER N. DE GUIRE, OF TERRELL, TEXAS.

IMPROVEMENT IN CHURN-DASHERS.

Specification forming part of Letters Patent No. 167,493, dated September 7, 1875; application filed July 22, 1875.

*To all whom it may concern:*

Be it known that we, JOHN D. BRIGHT and JASPER N. DE GUIRE, of Terrell, in the county of Kaufman and in the State of Texas, have invented certain new and useful Improvements in Churn-Dasher; and do hereby declare that the following is a full, clear, and exact description thereof, reference being had to the accompanying drawing and to the letters of reference marked thereon, making a part of this specification.

The nature of our invention consists in the construction and arrangement of a churn-dasher, as will be hereinafter more fully set forth.

Figure 1:
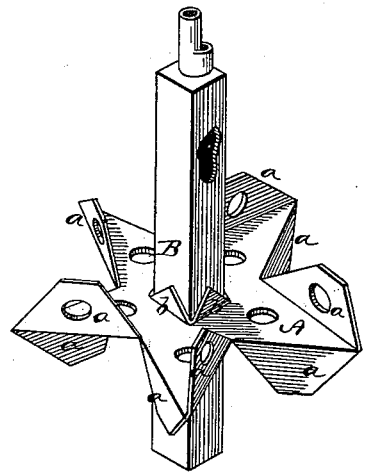
Figure 2:
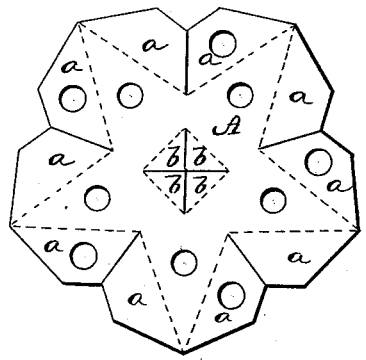

In the annexed drawing, Figure 1 is a perspective view of our churn-dasher, and Fig. 2 is a diagram showing the construction of the dash proper.

Our churn-dasher is made of sheet metal, in the form of a five-pointed star, A, having a flange, $a$, along each side of the five points. One flange of each point is bent vertically upward, and the other flange vertically downward, and these flanges, as well as the points of the dasher, are perforated, as shown.

This dasher may be cut or stamped of sheet metal at one operation, and the flanges then bent, as described, making it very cheap.

In the center of the dasher are cut two cross-slits, forming four triangular flanges, $b$, surrounding a square hole through which the stem or dasher-rod B is passed. The stem or rod B is made square and hollow, as shown, and the four flanges $b$ form springs to hold the dasher on the stem at any height desired, according to the quantity of cream in the churn. The hollow stem B is provided with a suitable inlet at the top, and holds a sufficient quantity of water, either hot or cold, to give the cream the right temperature.

The dasher and stem are intended to rotate in the cream so rapidly that it creates a vacuum from the top of the cream to the bottom of the churn, the cream rising the highest at the corners of the churn, (it being square,) and falls rapidly to the bottom at the center, and carries with it a large amount of air, causing it to mix freely with the cream, thereby converting it rapidly into butter, or rather causing the butter to be collected in a very short time by thoroughly breaking the globules of the cream.

Having thus fully described our invention, what we claim as new, and desire to secure by Letters Patent, is—

1. The within-described churn-dasher, formed of a single sheet of metal and in star-shape, with alternating upward and downward flanges $a\ a$, and with central spring-lips $b\ b$, all substantially as set forth.

2. The combination of the perforated sheet-metal plate A with alternating up-and-down flanges $a\ a$, the central spring-lips $b\ b$, and the hollow shaft B, the dasher being adjustable on the shaft and held by the spring-lips, all substantially as set forth.

In testimony that we claim the foregoing we have hereunto set our hands this 22d day of May, 1875.

JOHN D. BRIGHT.
JASPER N. DE GUIRE.

Witnesses:
J. W. JOHNSON,
H. D. MILLER.